(12) United States Patent
Nagao et al.

(10) Patent No.: US 7,573,390 B2
(45) Date of Patent: Aug. 11, 2009

(54) SPLIT-ABLE LABEL

(75) Inventors: Takuya Nagao, Ichinomiya (JP); Takaaki Mizukawa, Hiroshima (JP)

(73) Assignees: Iwata Label Co., Ltd., Ichinomiya (JP); Miyake, Inc., Hiroshima (JP)

( * ) Notice: Subject to any disclaimer, the term of this patent is extended or adjusted under 35 U.S.C. 154(b) by 150 days.

(21) Appl. No.: 10/592,054

(22) PCT Filed: Mar. 14, 2005

(86) PCT No.: PCT/JP2005/004470

§ 371 (c)(1), (2), (4) Date: Sep. 8, 2006

(87) PCT Pub. No.: WO2005/088585

PCT Pub. Date: Sep. 22, 2005

(65) Prior Publication Data

US 2007/0146140 A1 Jun. 28, 2007

(30) Foreign Application Priority Data

Mar. 15, 2004 (JP) .......................... 2004-073392
Mar. 15, 2004 (JP) .......................... 2004-073393

(51) Int. Cl.
*G08B 13/14* (2006.01)
(52) U.S. Cl. .............. 340/572.8; 340/572.1; 340/572.7; 340/10.1
(58) Field of Classification Search .............. 340/572.8, 340/572.1, 572.7, 10.1, 10.5, 505
See application file for complete search history.

(56) References Cited

U.S. PATENT DOCUMENTS

| 4,694,283 A | * | 9/1987 | Reeb | 340/572.5 |
|---|---|---|---|---|
| 5,884,425 A | * | 3/1999 | Baldwin | 40/638 |
| 5,979,941 A | * | 11/1999 | Mosher et al. | 283/67 |
| 6,281,795 B1 | * | 8/2001 | Smith et al. | 340/572.1 |
| 6,297,727 B1 | * | 10/2001 | Nelson, Jr. | 340/10.1 |
| 7,375,635 B2 | * | 5/2008 | Kessler | 340/572.1 |
| 2002/0191998 A1 | * | 12/2002 | Cremon et al. | 400/76 |
| 2003/0220876 A1 | * | 11/2003 | Burger et al. | 705/50 |
| 2005/0091896 A1 | * | 5/2005 | Kotik et al. | 40/633 |
| 2005/0253726 A1 | * | 11/2005 | Yoshida et al. | 340/572.8 |
| 2007/0139199 A1 | * | 6/2007 | Hanlon | 340/572.1 |

FOREIGN PATENT DOCUMENTS

JP 7-22695 5/1995

(Continued)

*Primary Examiner*—Toan N Pham
*Assistant Examiner*—Travis R Hunnings
(74) *Attorney, Agent, or Firm*—Oliff & Berridge, PLC

(57) ABSTRACT

A split-able label 10 of the present invention is configured as having an adhesive layer 2 on a back surface 1b of a label base 1, having a plurality of sections, being split-able over a boundary 1c of a first section 11 and a second section 12 when affixed to an object A, and being provided with an ID tag 3 comprising an IC chip 31 storing information of the object A and a transmitter-receivers 32 transmitting the information from and to a external device R, on one of, or both of the first section 11 and the second section 12. It is aimed to provide the split-able label capable of storing a large amount of detailed information, and being split and affixed respectively depending on uses, by the above configuration.

18 Claims, 16 Drawing Sheets

FOREIGN PATENT DOCUMENTS

| | | |
|---|---|---|
| JP | 2548327 | 5/1997 |
| JP | 2000-57292 | 2/2000 |
| JP | 2000057292 A * | 2/2000 |
| JP | 2000-132104 | 5/2000 |
| JP | 2000132104 A * | 5/2000 |
| JP | 2002-342727 | 11/2002 |
| JP | 2004-45944 | 2/2004 |

* cited by examiner

SPLIT-ABLE LABEL

RELATED APPLICATIONS

This application claims the priorities of Japanese Patent Application No. 2004-073392 filed on Mar. 15, 2004 and Japanese Patent Application No. 2004-073393 filed on Mar. 15, 2004, which are incorporated herein by reference.

BACKGROUND OF THE INVENTION

1. Field of the Invention

This invention relates to a split-able label.

2. Description of the Related Art

It has been known a split-able label configured so as to be split to a plurality of sections, allowing each section to be affixed separately depending on applications. This sort of split-able label is often used for medical goods or the like. For example, ampoules and vial containers for drug solutions are required to show predetermined particulars on the label affixed on the body thereof under an obligation. The label has a sub-section preliminarily written with the same information as the predetermined particulars given on the body (the main section), the sub-section is split off from the main section, and then affixed separately on an injection syringe, a clinical chart or the like, thereby contributing to suppress medical errors such as false administration of drug solutions, false entries to clinical charts or the like. Today, information such as lot numbers, expiry date or the like, are provided to labels in a form of printed analog code such as bar-code or two dimensional code, for the purpose of management of manufacturing and distribution of the products.

(First Aspect)

Recently it has been sought after to incorporate more detailed information into labels. However it is difficult to increase a display area due to a shape or size of objects to be affixed with the label. Considering the above situation, it is therefore an object of a first aspect of the present invention to provide a split-able label capable of incorporating more detailed and a greater volume of information, and also affixable separately depending on applications.

(Second Aspect)

Recently a non-contact-type ID tag (typically referred to as RFID: radio frequency identification) has attracted attentions and has been applied to the field of labels. The ID tag is configured as storing a large volume of information in an IC chip, and as having a flat antenna connected to the IC chip allowing transmission of information to and from the IC chip. When the antenna receives radio wave at a predetermined frequency sent by a reader the stored information within the IC chip is sent to the reader through the antenna, responding to the frequency. However the information on the label having the non-contact-type ID tag can easily be read through non-contact communications by the reader, so that the information on the discarded label may possibly be read and used for evil purposes. Considering the above, it is therefore an object of a second aspect of this invention to provide a split-able label capable of disabling reading of the information after use.

Patent Literature 1: Japanese Patent Application Laid-Open No. 2000-132104

Patent Literature 2: Japanese Utility Model Application Laid-Open No. H7(1995)-22695

Patent Literature 3: Japanese Utility Model Registration No. 2548327

SUMMARY OF THE INVENTION (First Aspect)

In order to solve the above-described problems, a split-able label of a first aspect is configured as having an adhesive layer provided to the back surface of a label base which is composed of a plurality of sections, and as allowing, in a state of being affixed on an object to be identified, splitting-off of a second section from the adjacent first section at the boundary therebetween, wherein an ID tag, including an IC chip storing identification information of the object, and a transmitter-receiver connected to the IC chip so as to transmit the identification information to and from an external device, is disposed on the back surface of at least one of, or both of the first section and the second section.

By providing a readily-readable ID tag, capable of storing a large volume of identification information of objects, to either one of, or both of the first section and the second section of the split-able label, the first aspect of the invention allows more detailed and a larger volume of information (information on how to use, for example) to be incorporated thereinto, and makes it possible to independently affix the individual sections depending on applications.

(Second Aspect)

In order to solve the above problems, a split-able label of the second aspect is configured as having an adhesive layer provided to the back surface of a label base which is composed of a plurality of sections, and as allowing, in a state of being affixed on an object to be identified, splitting-off of a second section from the adjacent first section at the boundary therebetween, wherein a non-contact ID tag, including an IC chip storing identification information of the object, and an antenna connected to the IC chip so as to transmit the identification information to and from an external device, is disposed on the back surface of the label base, and the antenna is formed over the boundary between the first section and the second section, and is cut upon splitting-off of the second section.

According to the second aspect, the antenna is cut upon splitting-off of the second section, so that the identification information is readable before the division of the first section and the second section of the label, but becomes unreadable after splitting-off of the second section. More specifically, the antenna is formed with a predetermined length so as to receive radio wave at a predetermined frequency, so that it is disabled after being cut. Therefore, this configuration can typically prevent any information from being read from the discarded labels.

BEST MODES FOR CARRYING OUT THE INVENTION (First Aspect)

Figure 1:
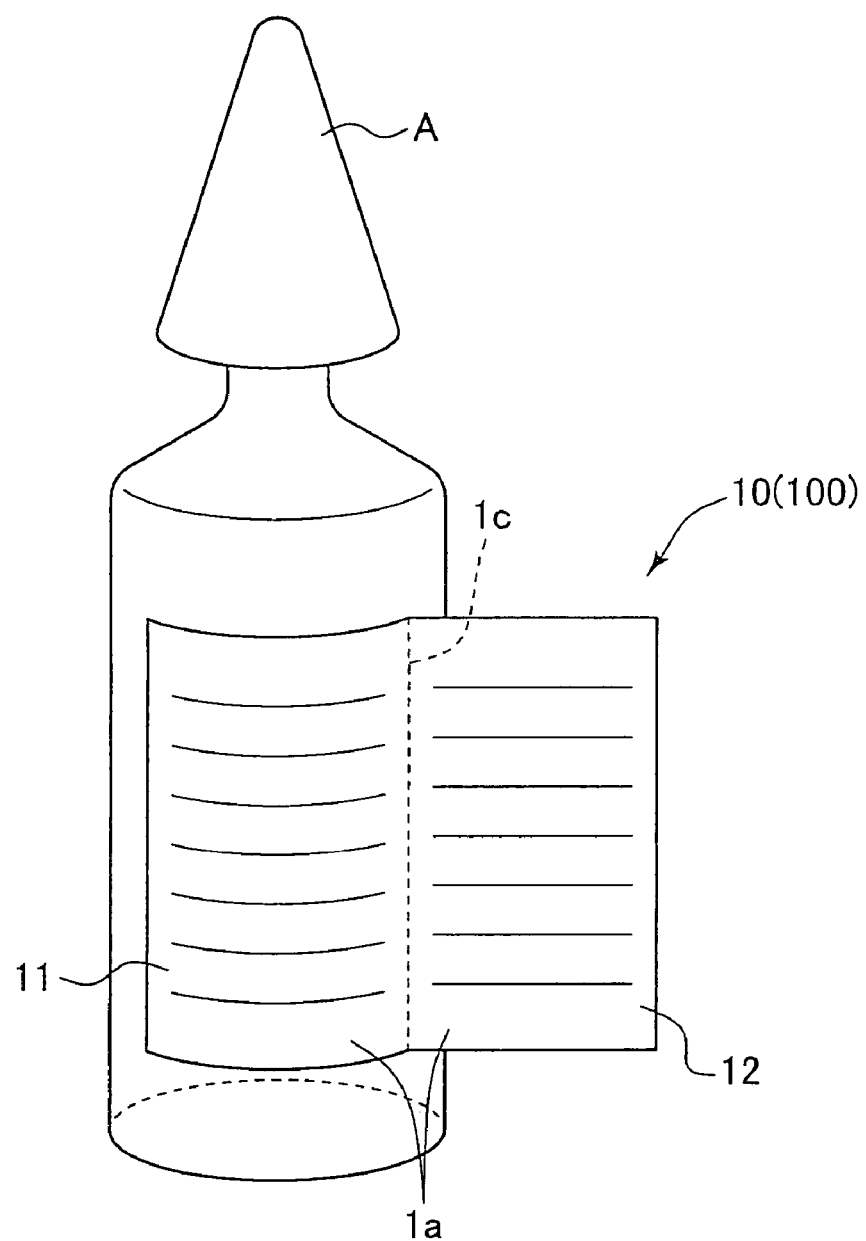
FIG. 1 is a schematic drawing showing a state of a split-able label affixed on an object.
Figure 2:
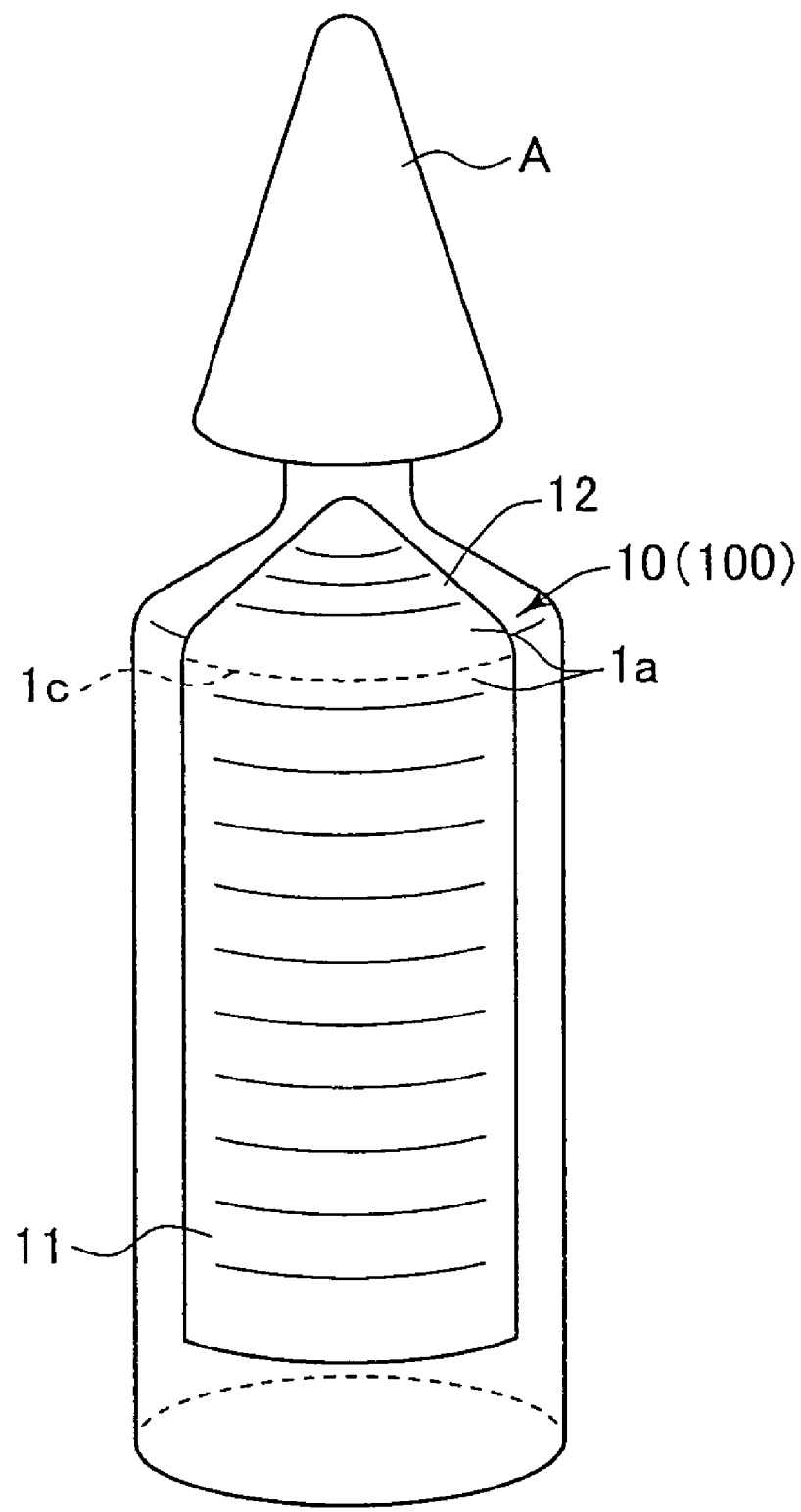
FIG. 2 is a drawing showing a modified example of the split-able label shown in FIG. 1.
Figure 6:
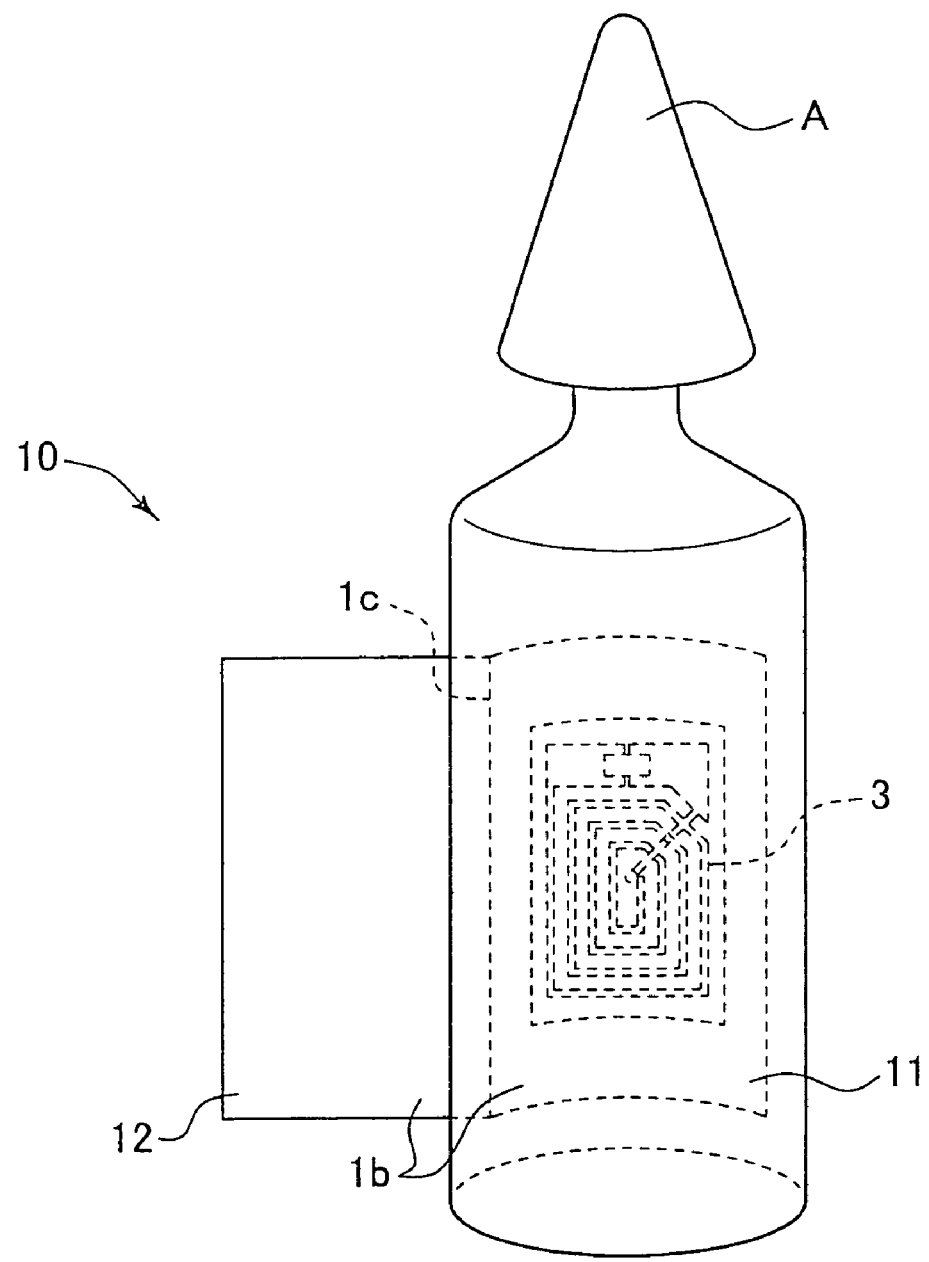
FIG. 6 is a rear view of the split-able label.

An embodiment of the first aspect of this invention will be described below with reference to the accompanied drawings. The description will be made on a container such as an ampoule for drug solutions or the like used as a labeled object (object to be identified), however the object is not limited thereto. FIGS. 1 and 2 show drawings of a split-able label 10 affixed to a container "A". FIG. 6 is a rear view of the same. The split-able label 10 has a top surface 1a of a label base 1 as an information display surface and a back surface 1b having an adhesive layer as an adhesive surface. More specifically, the label base 1 is configured as having a first section 11 and a second section 12, as being split-able at a cutting line 1c provided at the boundary therebetween. Information about a drug solution (such as product name, product information, production lot, expiry date or the like) in the container "A" is shown respectively on the top surface 1a of the first section 11 and the second section 12. The split-able label 10 is affixed to the container "A" while keeping the first section 11 and the second section 12 in an integrated manner, and the second section 12 is split off on the cutting line 1c, for affixation separately to an injection syringe, a clinical chart, or the like, when the drug solution in the container "A" is taken out. In this embodiment, the label base 1 has two sections, whereas the number of sections is not limited as long as the first section and the second section are split-able. FIGS. 1 and 2 show a state wherein the second section is not affixed to the container "A" for the convenience of explanation on splitting-off of the sections, whereas the second section may be configured as being affixed to the container "A" before the splitting, as being peeled off from the container "A", and as being re-affixed to another object (an injection syringe, a clinical chart or the like). In this case, an adhesive layer 2 which is removable even after being once affixed, and re-affixable even after being removed, may appropriately be selected.

The first section 11 and the second section 12 of the label base 1 may be configured typically, shown in FIG. 1, so as to align the boundary (the cutting line 1c) therebetween with the axial direction of the container as shown in FIG. 2, or so as to align the boundary (the cutting line 1c) with the circumferential direction of the container "A", as shown in FIG. 2. It is also possible to provide a tab extended from the outer circumference of the sections for the convenience of splitting-off of the sections. In order to prevent the adhesive from sticking on the hands of the user who splits the label, the back surface of the tab may have no adhesive layer provided thereon, or may have a cover layer covering the adhesive layer. The adhesive layer can be formed by printing on the cover layer. Similarly by using this sort of cover layer, a portion having no adhesiveness can be formed not only on the tab but also on a part of the back surface.

Figure 3:
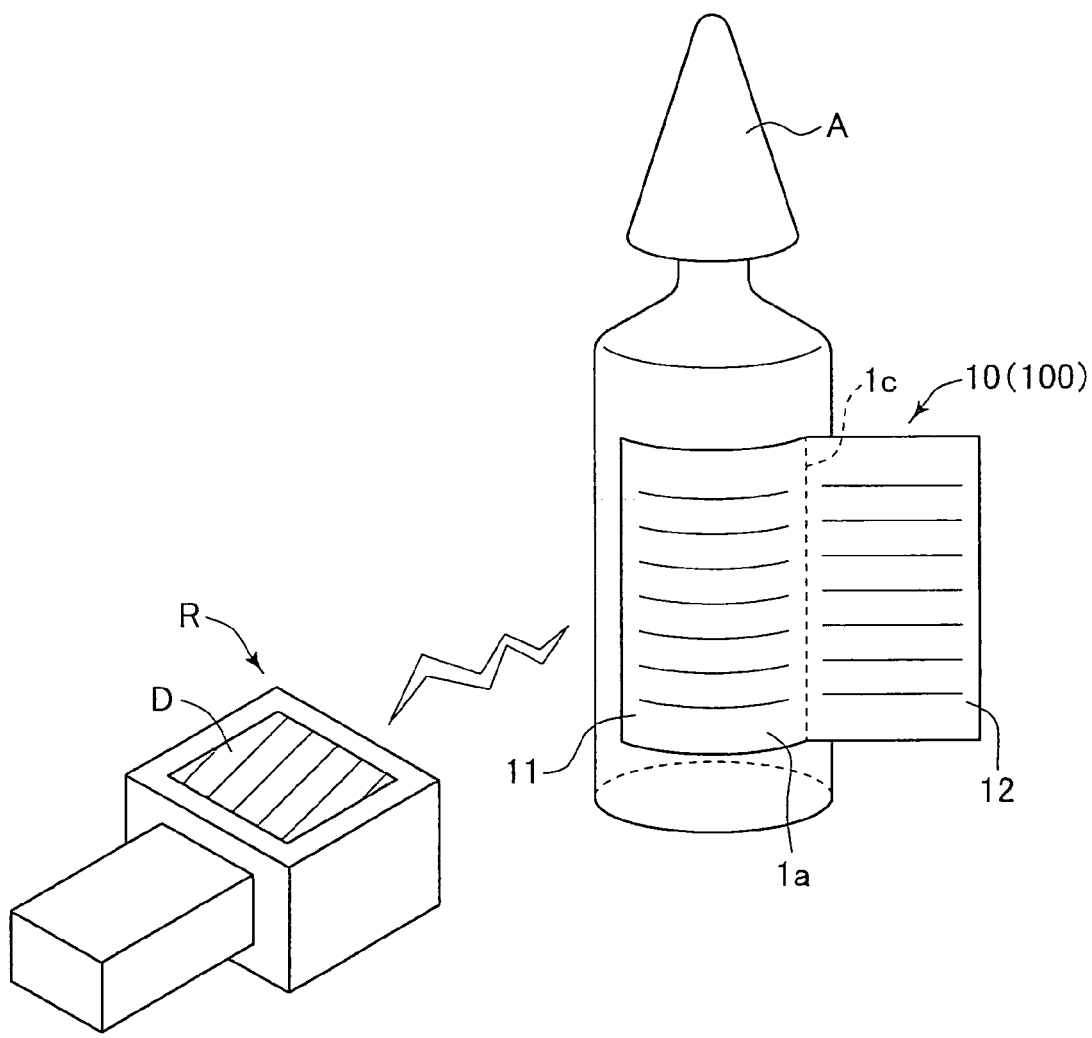
FIG. 3 is a schematic drawing showing a state of reading of identification information by an external device.
Figure 4:
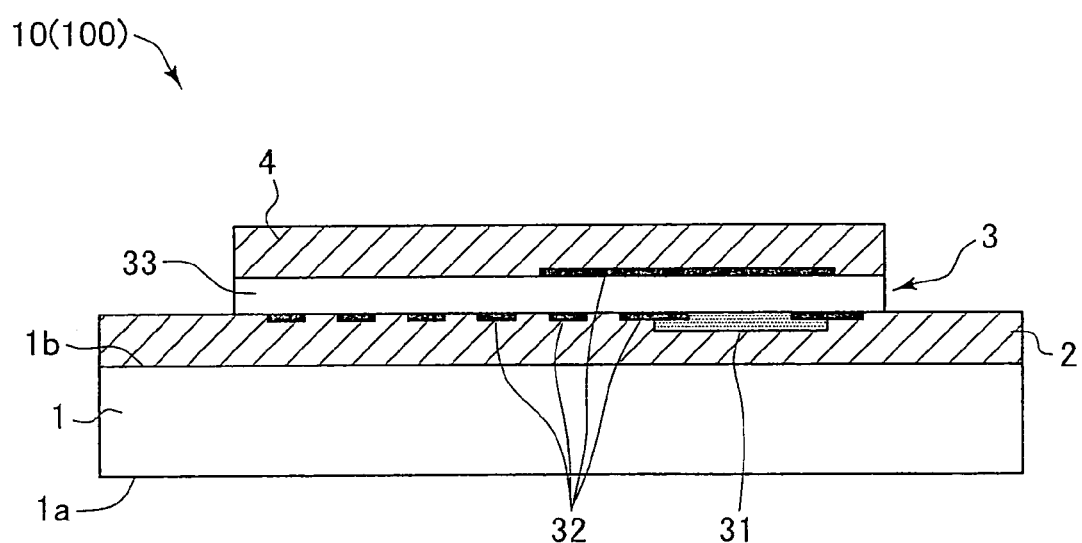
FIG. 4 is a schematic drawing showing a sectional structure of the split-able label having a non-contact-type ID tag provided thereto.
Figure 10:
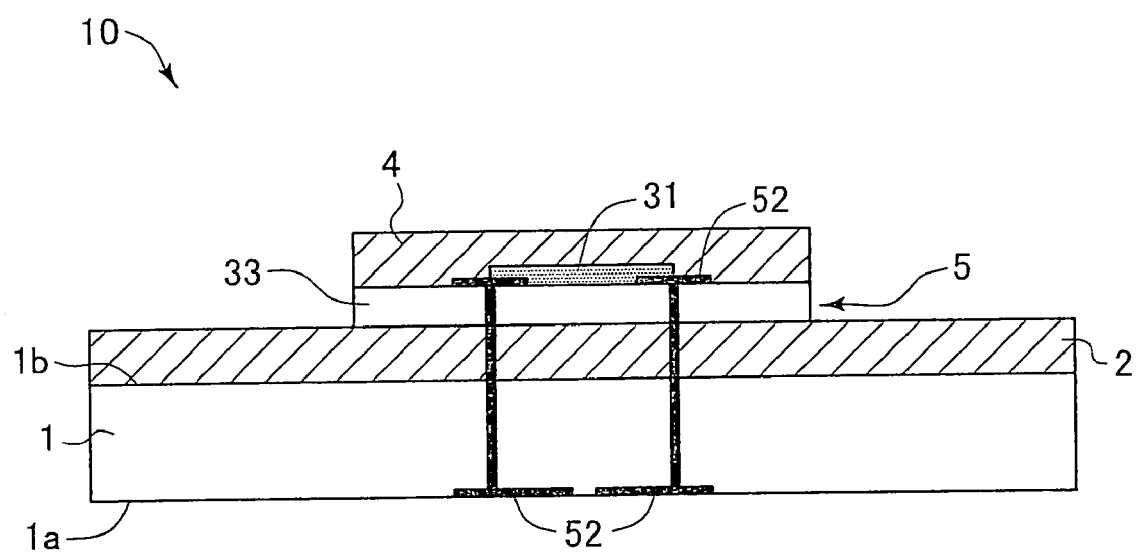
FIG. 10 is a schematic drawing showing a sectional structure of the split-able label having a contact-type ID tag provided thereto.

An ID tag explained below is provided on one of, or both of the first section 11 and the second section 12. As shown in FIGS. 4 and 10, ID tags 3 and 5 include an IC chip 31 storing identification information (ID) of the drug solution in the container, and transmitter-receivers 32 and 52, respectively, connected to the IC chip 31 so as to transmit the identification information (ID) to and from an external device (an external reader R shown in FIG. 3). Use of the above-described tags 3 and 5 allows the split-able label 10 to store more detailed information.

Figure 5:
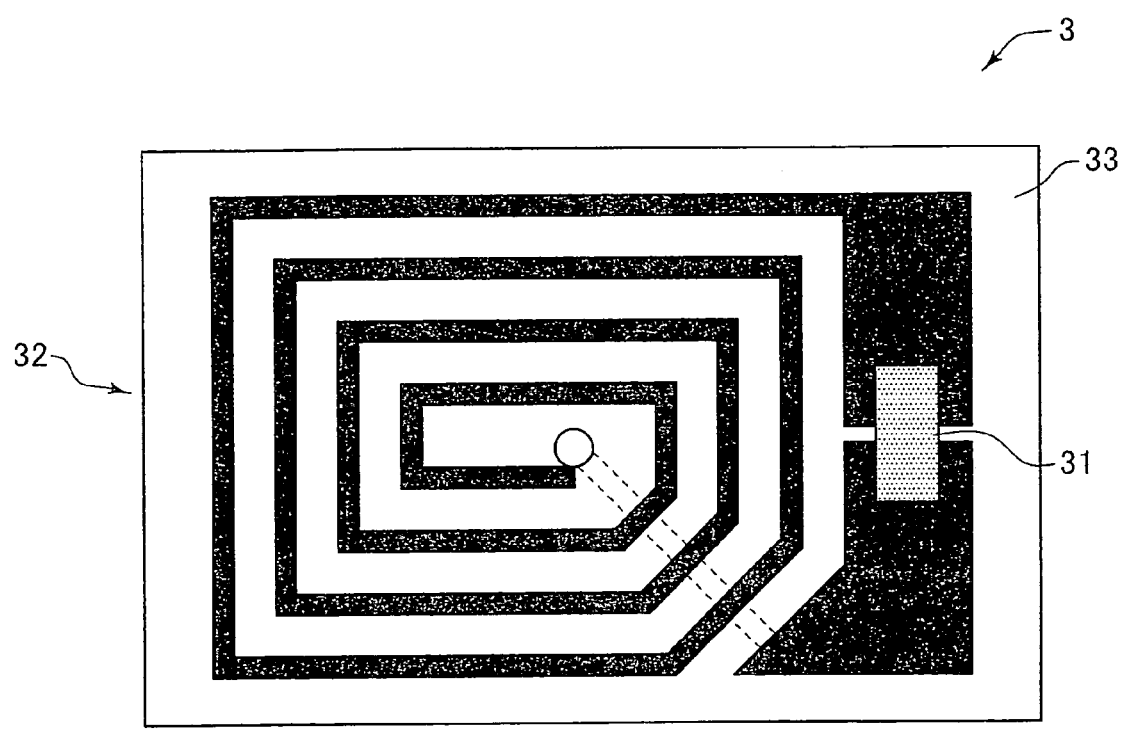
FIG. 5 is a schematic drawing showing a structure of the non-contact-type ID tag.

As shown in FIGS. 4 and 5, the ID tag can be configured as a non-contact-type ID tag 3, having the transmitter-receiver composed of an antenna 32, and is capable of transmitting the identification information (ID) to and from the external device (the external reader R shown in FIG. 3) through non-contact communication. More specifically, the non-contact-type ID tag 3 includes a support sheet 33 formed integrally with the IC chip 31 and the antenna (transmitter-receiver) 32 so as to support them. The antenna 32 is formed, as shown in FIG. 5, with a spiral pattern on one main surface of the support sheet 35 so as to be configured as a flat coil, and so as to have an interconnection drawn outwardly from the center of the spiral onto the other main surface, and the both ends of the antenna are respectively connected to the terminals of the IC chip 31. The Antenna 32 has a predetermined length so as to receive electromagnetic wave of a specific frequency. In other words, the non-contact-type ID tag 3 adopts an electromagnetic induction system by which an electromagnetic wave of a specific frequency is received by the antenna 32, and communication is enabled making use of voltage induced in an induction magnetic flux.

The non-contact-type ID tag 3 and the reader R communicates specifically by the data carrier system, wherein the reader R sends electromagnetic wave of a specific frequency to the non-contact-type ID tag 3, and the IC chip 31 receives the electromagnetic wave through the antenna 32. Upon reception, a power generation circuit activates to carry out a predetermined power generation, and a sender circuit then activates while being powered by the power generation circuit. The sender circuit reads the identification information (ID) stored in the memory regarding the drug solution in the container "A", and then sends the information, as being carried by an electric wave, through the antenna 32 to the reader R. The reader R receives and recognizes the identification information carried by the electric wave. Then the recognized identification information is shown on a display D of the reader R (see FIG. 3). Also update information is sent from the reader R through the antenna 32 to the IC chip 31, so as to update the information stored in the IC chip 31. While the IC chip 31 in this embodiment is configured by a passive chip operable based on an external power supply, it is also possible to adopt an active-type chip having a built-in battery.

The ID tag may be configured also as a contact-type ID tag 5, as shown in FIG. 10, in which the transmitter-receiver is composed of a contact terminal 52 exposed on the top surface 1a of the label base 1, allowing transmission of the identification information to and from an external device (the external reader R: not shown) through contact communication. In other words, electric power is supplied to the IC chip 31 by allowing the terminal of the reader R to contact the terminal 52, wherein the identification information (ID) is concurrently read. Operations of the IC chip 31 after the power supply are the same as described in the above. The contact-type ID tag 5 needs no antenna, and needs a smaller area than the non-contact-type ID tag 3 does, so that it is conveniently applicable to an object having only a small area for placement of the section to be split off (second section 12).

The above-described ID tags 3 and 5 can be configured typically as shown in FIGS. 4 and 10. That is, the tags can be configured as having, on the back surface 1b of the label base 1, the adhesive layer 2 covering the entire back surface 1b, the ID tag 3 or 5, and an adhesive cover layer 4 covering at least the ID tag 3 or 5 formed in this order. This configuration, having the entire back surface 1b of the label base 1 covered with the adhesive layer, is successful in obtaining a sufficient adhesive force as a label, although increase in the area of the ID tags 3 and 5 may occasionally fail in obtaining a sufficient level of adhesive force to the container "A" (object for the affixation), due to decrease in the exposed area of the adhesive layer 2.

The transmitter-receiver (the antenna 32) may be configured typically using a lead wire, or by pattern printing using a conductive ink. The transmitter-receiver (the antenna 32) can further be configured so that the surface opposite to the surface faced to the back surface of the label base 1 (the surface covered with the adhesive cover layer 4 in FIG. 4) is colored the same as the back surface 1b of the label base 1. For an exemplary case of transparent container, it is poor-looking that the antenna 32 placed on the back surface 1b of the label base 1 is seen through the container "A" from the back side of the site of placement. The antenna 32 can, however, be less visible by coloring the antenna 32 on the surface thereof, opposite to the surface faced to the back surface 1b, the same as the back surface 1b. There is no special limitation on color of any other portion of the transmitter-receiver (antenna 32), so far as the surface thereof opposite to the surface faced to the back surface 1b of the label base 1 is colored the same with the back surface 1b of the label base 1.

The support sheet 33 may be composed of base films such as those made of polyethylene (PE), polypropylene (PP), polyethylene terephthalate (PET) and the like, or paper materials such as those made of wood-free paper, synthetic paper and the like. The support sheet 33 may be configured as being transparent, or configured so that the surface opposite to the surface faced to the back surface 1b of the label base 1 is colored the same as the back surface 1b of the label base 1, so as to prevent the support sheet 33, as described in the above, from being seen through the container "A" from the back side of the site of placement. It is enough for the support sheet 32 that the surface opposite to the surface faced to the back surface 1b of the label base 1 is colored the same as the back surface 1b of the label base 1, without any special limitation on color of the other portions thereof.

Figure 11:
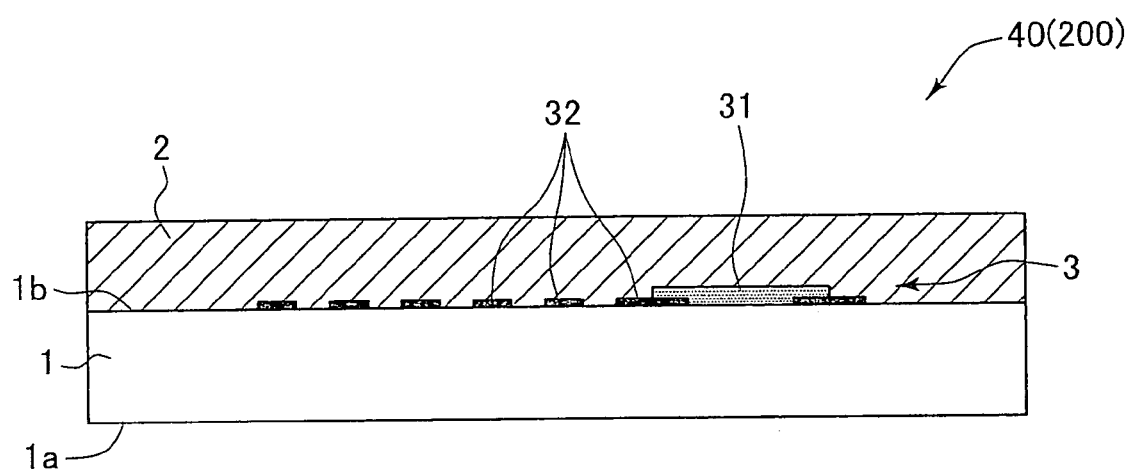
FIG. 11 is a drawing showing a sectional structure of the split-able label having a non-contact-type ID tag provided thereto.

On the other hand, the non-contact-type ID tag 3 can be placed typically as shown in FIG. 11. That is, the label can be configured as having, on the back surface 1b of the label base 1, the non-contact-type tag 3 formed directly on the back surface 1b, and the adhesive layer 2 covering the entire back surface 1b together with the non-contact-type ID tag 3, formed in this order. This configuration can be realized typically by forming, on the back surface 1b of the of the label base 1, the non-contact-type ID tag 3 through pattern printing of the antenna 32 with a conductive ink, and mounting of the IC chip 31, and by covering the entire back surface 1b together with the non-contact-type ID tag 3 using the adhesive layer 2.

Figure 7:
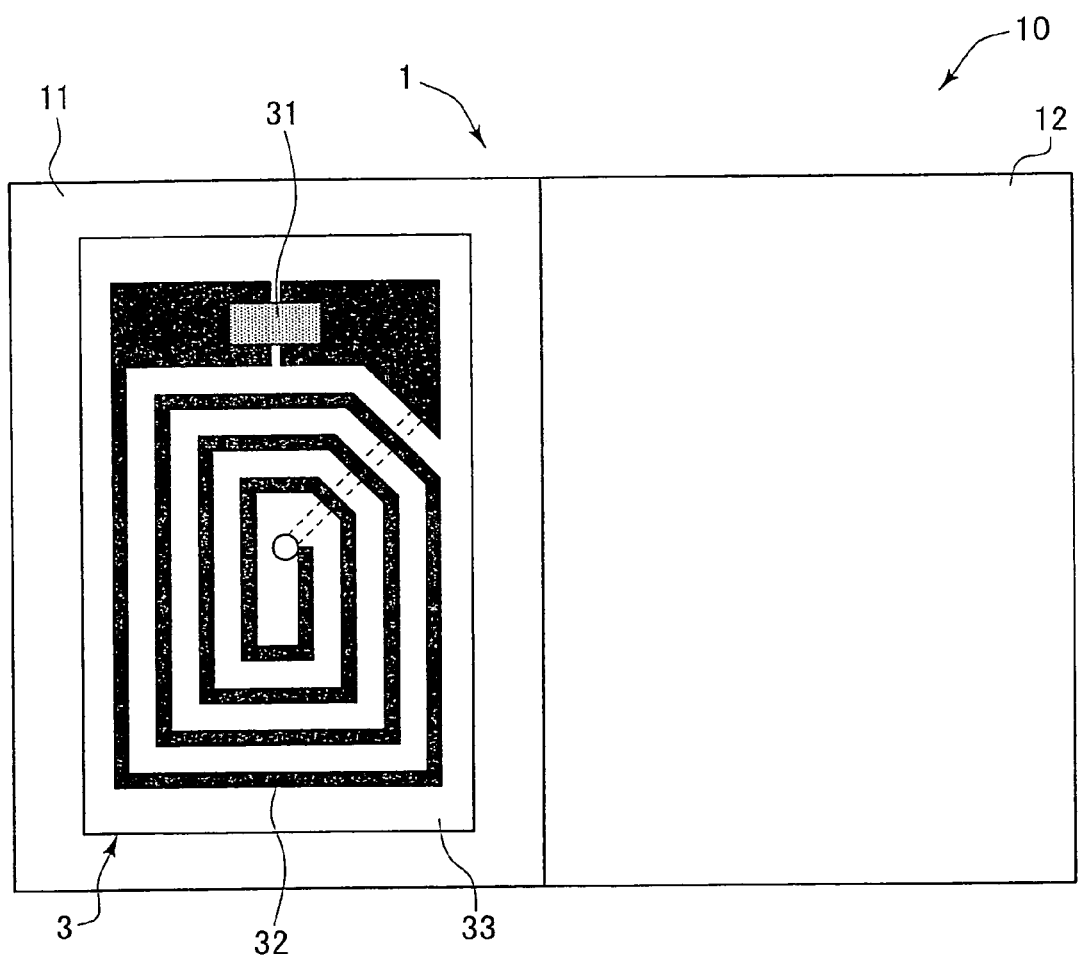
FIG. 7 is a drawing showing a first mode of placement of the ID tag.
Figure 8:
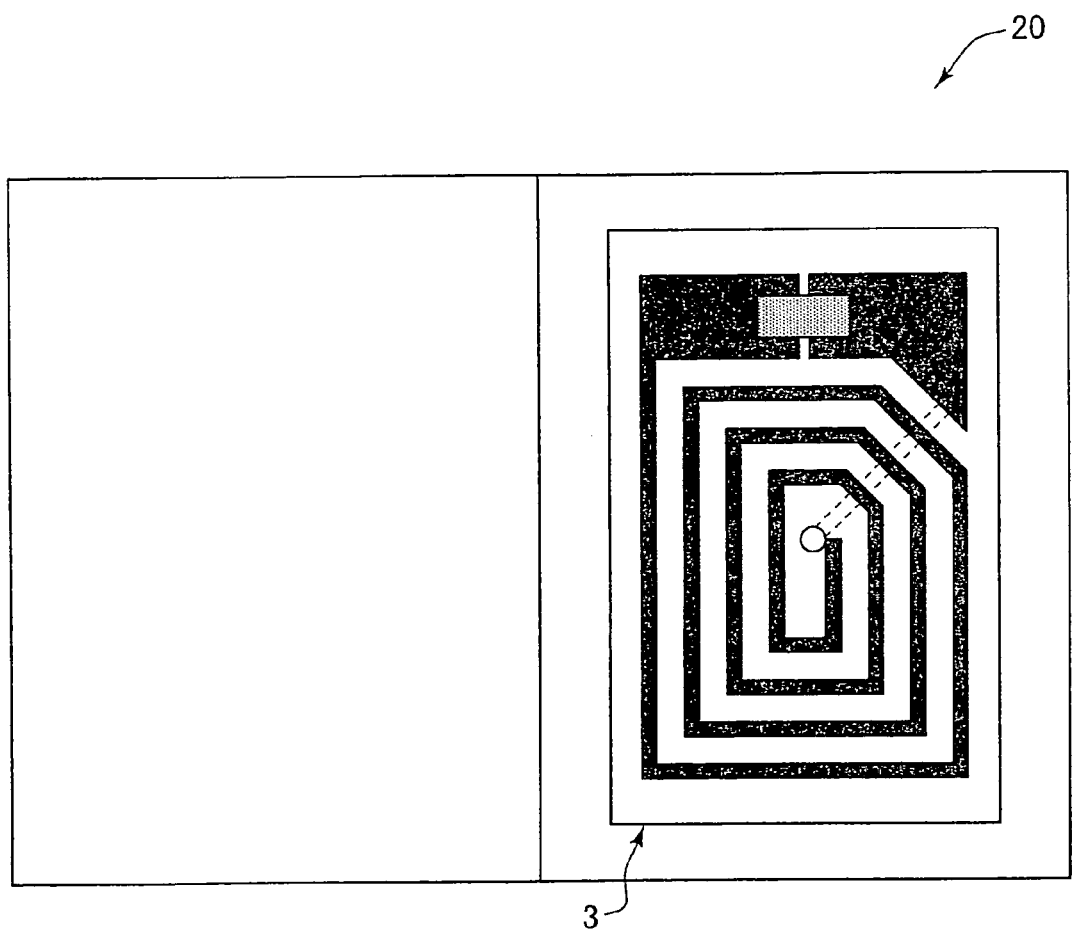
FIG. 8 is a drawing showing a second mode of placement of the ID tag.
Figure 9:
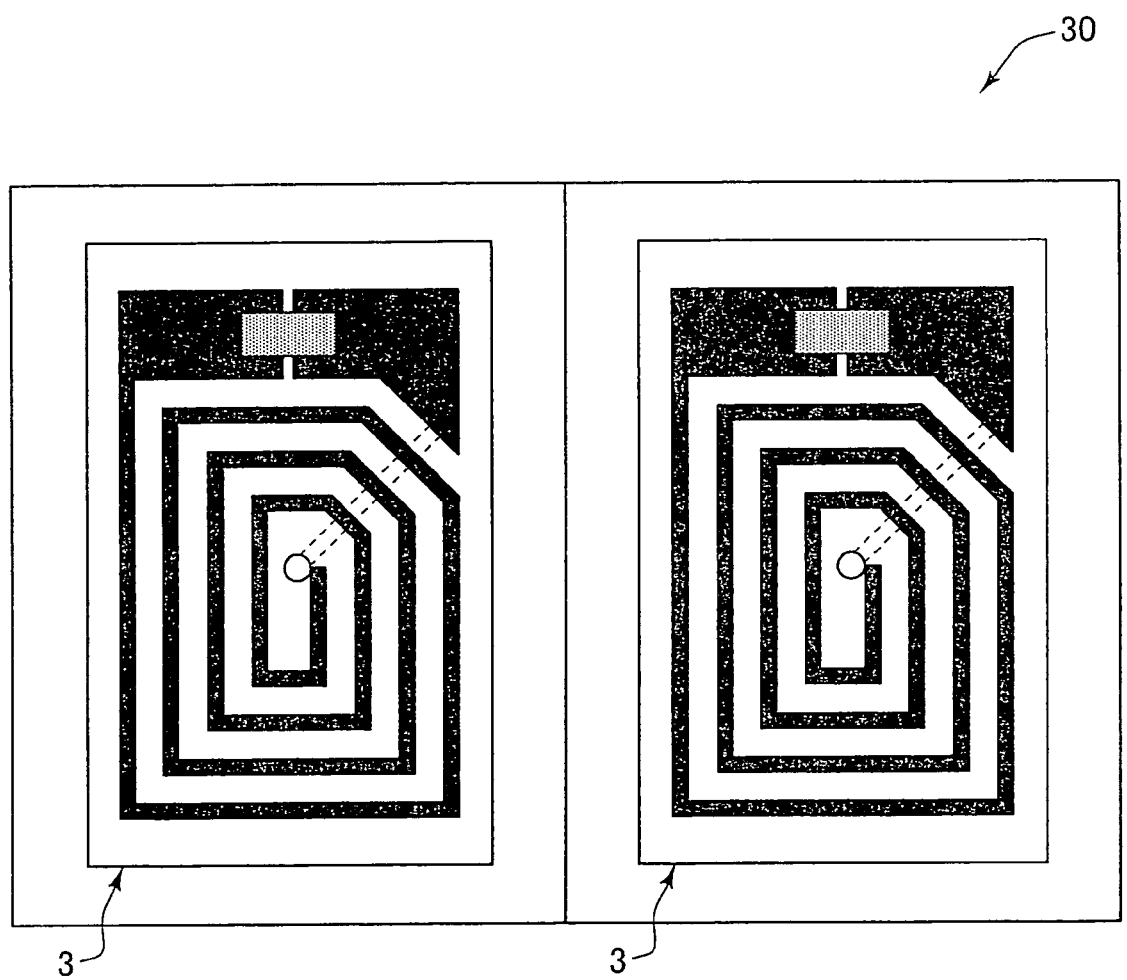
FIG. 9 is a drawing showing a third mode of placement of the ID tag.

As explained in the above, the ID tags 3 and 5 are affixed respectively on one of, or both of the first section 11 and the second section 12 of the label base 1. The individual modes of placement will be explained below. A first mode of placement, shown in FIG. 7, is such that the non-contact-type ID tag 3 is provided to the first section 11 to be affixed to the container "A". Even for an exemplary case where it became necessary to re-check the number of consumption or name of the products after discarded, re-checking can be made simply by holding the reader above the containers in a non-contact manner, without need of taking out the containers one by one. Therefore it is possible to check safely without touching the containers contaminated by the drug solution or the like. A second mode of placement shown in FIG. 8 is such that the non-contact-type ID tag 3 is provided to the second section 12 which is split off from the first section affixed on the container "A". In this case, it is possible to refer to, or to keep more detailed and a larger volume of information stored in the non-contact-type ID tag 3 at sites where the drug solution is consumed, in a form such as affixing the second section 12 to an injection syringe or the like after the drug solution is taken out, or in a form of affixing the second section 12 to the clinical chart after the drug solution is administered. A third mode of placement shown in FIG. 9 is such that the non-contact-type ID tags 3 are respectively provided to both of the first section 11 affixed to the container "A", and the second section 12 later split off therefrom. In this case, both advantages of the first and second modes of placement can be obtained. Although FIG. 9 illustrates the non-contact-type ID tags 3, it is not always necessary to use the non-contact-type ones, allowing use of the above-described, contact-type ID tags instead. In the third configuration, it is still also possible to adopt a non-contact-type ID tag for the one, and a contact-type ID tag for the other. For an exemplary case of a label to be affixed to containers of small diameters, the second section 12 to be split off is often formed smaller in size as compared with the first section 11 remained on an ampoule after the splitting-off due to limitation of displayable area, so that it is preferable to place the contact-type ID tag on the second section side 12.

(Second Aspect)

Figure 12:
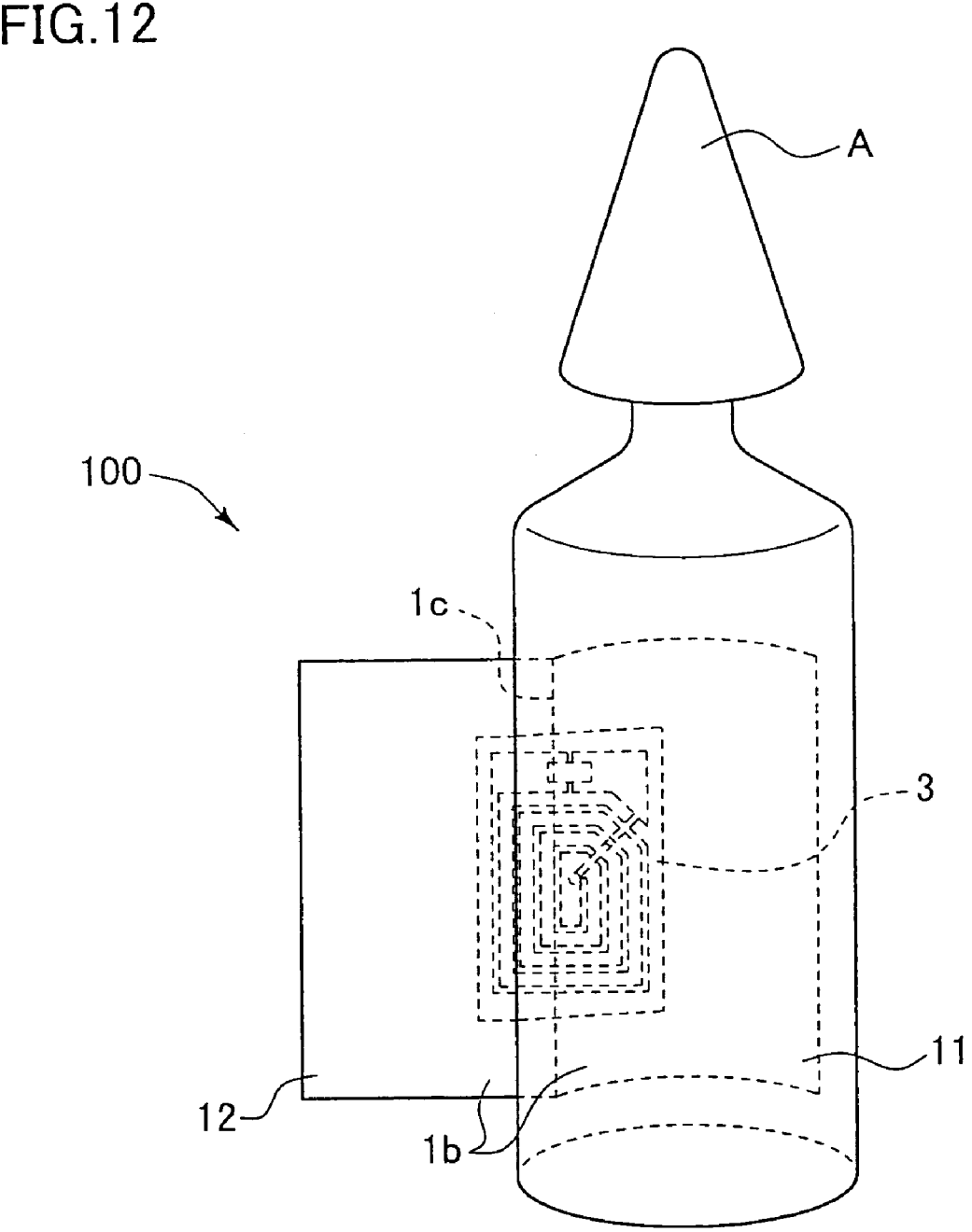
FIG. 12 is a rear view of the split-able label.

An embodiment of the second aspect of this invention will be described below with reference to the accompanied drawings. Descriptions overlap the first aspect will not be repeated, instead applying corresponding reference numerals in the drawings. FIGS. 1 and 2 are drawings showing a state of placement of a split-able label 100 of the second aspect of this invention affixed to the container "A". FIG. 12 is a rear view thereof.

Figure 13:
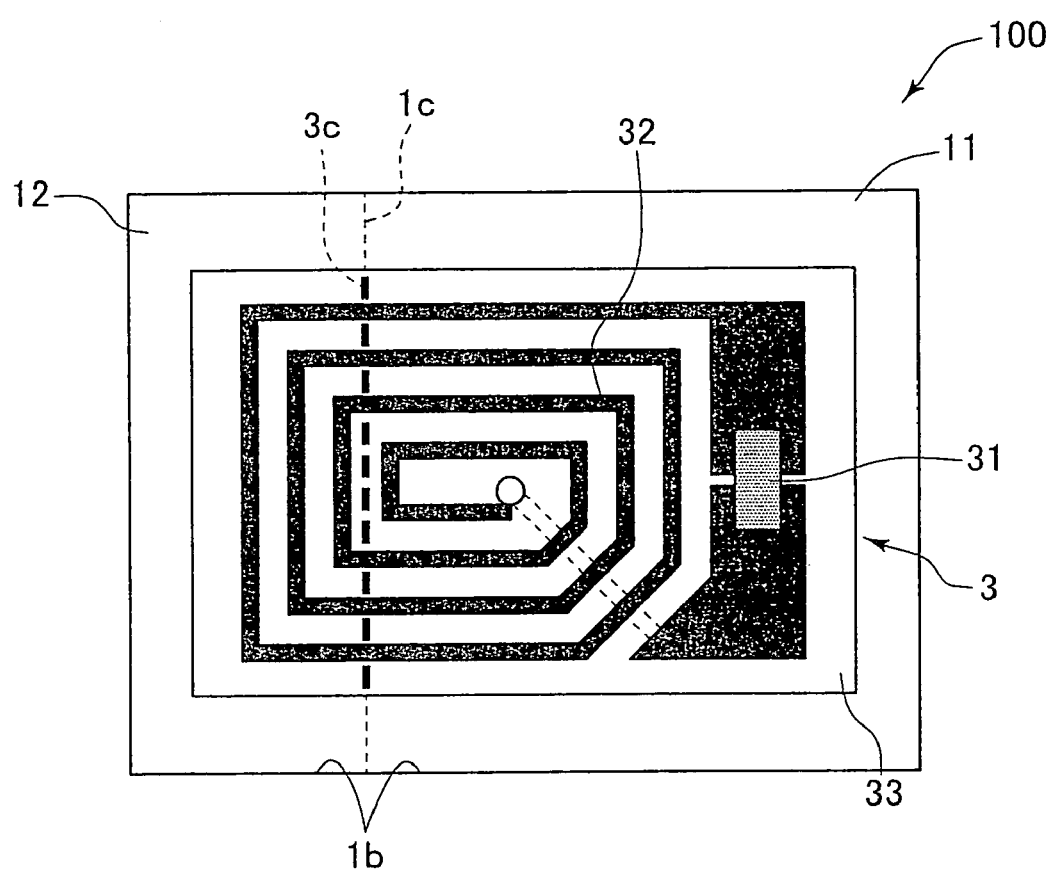
FIG. 13 is a schematic drawing showing a cutting line of the support sheet.
Figure 14:
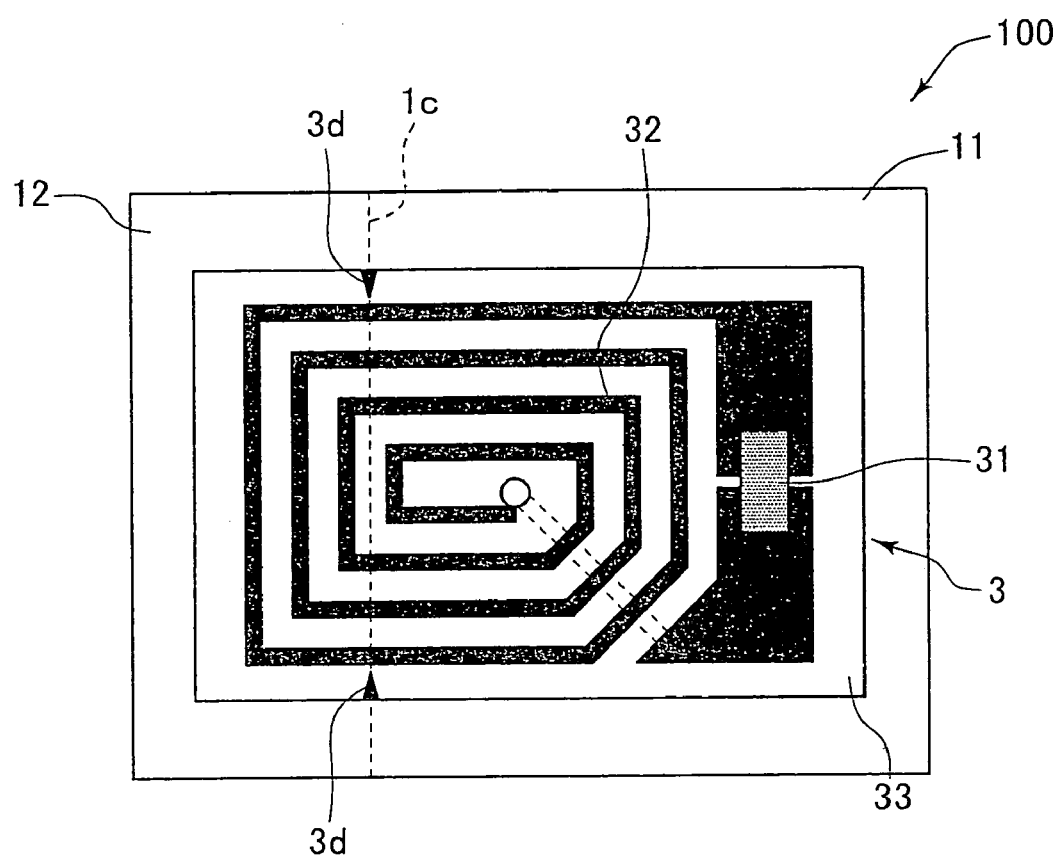
FIG. 14 is a schematic drawing showing an incision of the support sheet.

The split-able label 100 has the non-contact-type ID tag 3 is placed on the back surface 1b of the label base 1. The antenna 32 of the non-contact-type ID tag 3 is formed over the boundary 1c between the first section 11 and the second section 12 as shown in FIGS. 13 and 14, and is cut upon splitting-off of the second section 12. In this configuration, the identification information is readable before the division of the first section 11 and the second section 12, but becomes unreadable after splitting-off of the second section 12. More specifically, the antenna 32 is formed with a predetermined length so as to receive radio wave at a predetermined frequency, so that it is dysfunctioned after being cut. Information in the discarded labels is therefore prevented from being read.

The split second section 12 can separately be affixed to injection syringes, clinical charts or the like, so as to exhibit display function as a label.

Use of the support sheet 33 may possibly inhibit easy splitting-off of the second section 12, because the support sheet 33 covers the cutting line 1c of the label base 1. The support sheet 33 then preferably has, as shown in FIG. 13, a cutting line 3c formed thereon over the boundary 1c between the first section 11 and the second section 12. This enables easy splitting-off of the second section 12. It is not always necessary for the cutting line 3c to completely overlap the boundary 1c, and only proximity to the boundary 1c will suffice.

It is preferable to form a cutting portion along the cutting line 3c on the support sheet 33 so as to avoid the antenna 32, in view of avoiding damage to the antenna 32. That is, the antenna 32 in this case is formed, as shown in FIG. 13, on the support sheet 33 in an uncut portion (between the cutting portions) along the cutting line 3c.

As another example, as shown in FIG. 14, an incision 3d may be formed at least one end of the boundary 1c between the first section 11 and second section 12 on the support sheet 33. Also this configuration allows easy splitting-off of the second section 12.

The IC chip 31 may be placed on either of the first section 11 and the second section 12. Placement of the IC chip 31 on the boundary 1c may, however, interfere splitting-off of the second section 12, so that it is preferable to avoid placement of the IC chip 31 on the boundary 1c.

Figure 16:
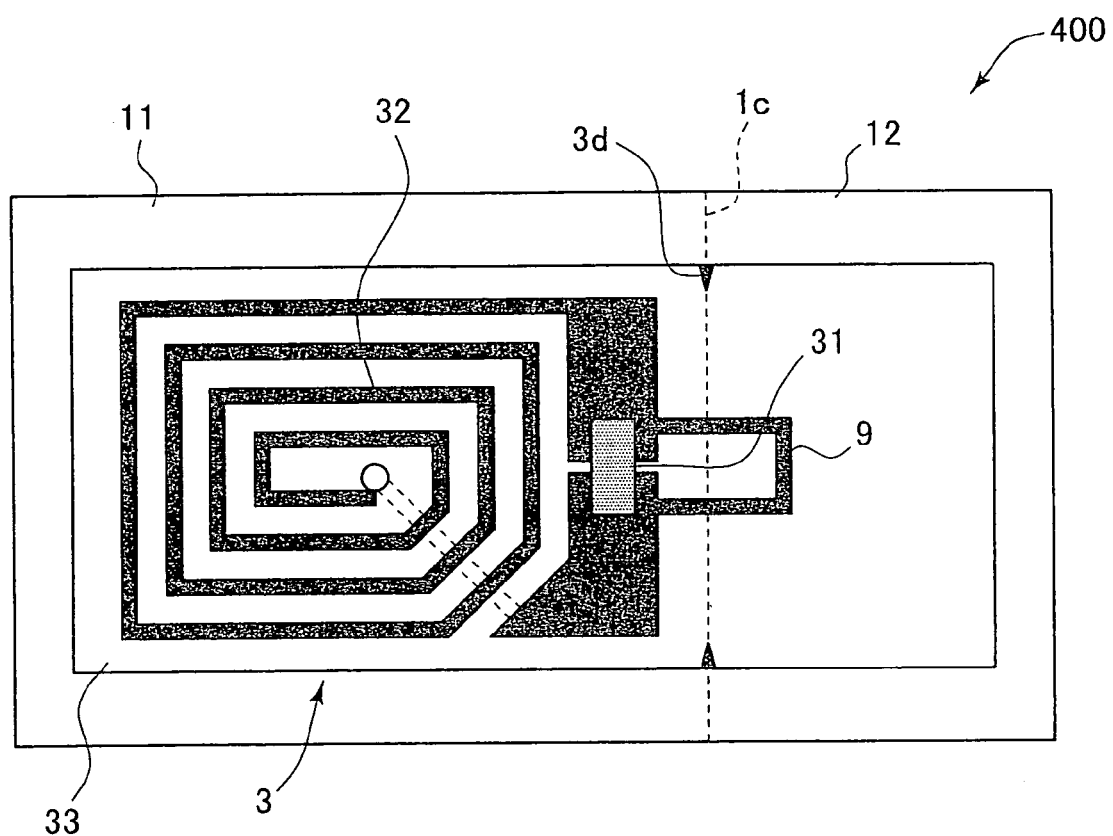
FIG. 16 is a drawing showing a modified embodiment of the ID tag.

In contrast to the above, it is also allowable to adopt a configuration, as shown in FIG. 16, wherein a short-circuit wiring 9 is provided as a part of the antenna 32 in order to short-circuit the end terminals of the IC chip 31, allowing only the short-circuit wiring 9 to fall on the boundary 1c between the first section 11 and the second section 12, so that the short-circuiting wiring 9 is disconnected upon splitting-off. In this configuration, the identification information remains unreadable before the splitting-off, contrary to the above-described function, because both terminals of the IC chip 31 are short-circuited with the short-circuit wiring 9. On the other hand, after the splitting-off, the antenna 32 functions and the identification information becomes readable, because the short-circuiting wiring 9 is disconnected.

Figure 15:
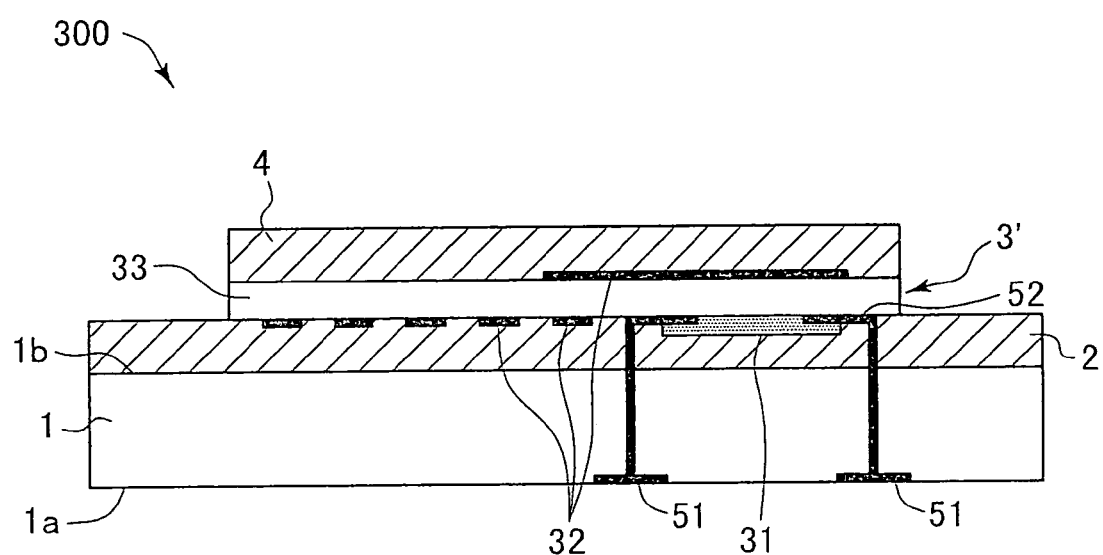
FIG. 15 is a schematic drawing showing a sectional structure of the split-able label comprising a contact-type ID tag provided separately thereto.

As a modified example, the split-able label according to the second aspect of this invention can be configured, as shown in FIG. 15, so that the non-contact-type ID tag 3 has contact terminals, as being connected to the IC chip 31, capable of transmitting the identification information (ID) to and from the external device through contact communication, and as being exposed to the top surface 1a of the label base 1. The contact terminals 51 may be provided as being branched from the antenna 32, or as being connected to the IC chip 31 irrespective of the antenna 32. This configuration enables reading of the identification information (ID) using the contact terminals 51 as emergency reading paths, even for the case where it became necessary to re-read the identification information again after splitting-off of the second section 12 of the label base 1.

The contact terminals 51 enable transmission of the identification information (ID) through contact communication to and from the external device (external reader R: not shown). More specifically, electric power is supplied to the IC chip 31 by allowing the terminal of the reader R to the contact terminal 51, wherein the identification information (ID) is concurrently read. Operations of the IC chip 31 after the power supply are the same as described in the above.

What is claimed is:

1. A split-able label comprising:
a label base having a back surface and being formed of a plurality of sections including a first section adjacent to a second section at a boundary therebetween, the back surface of the first section and the back surface of the second section not opposing each other;
an adhesive layer formed on the back surface of the label base;
an ID tag that includes an IC chip storing identification information of a first object to be identified and to which the split-able label is capable of being affixed and a transmitter-receiver connected to said IC chip so as to transmit the identification information to and from an external device,
wherein, in a state where the split-able label is affixed to the first object to be identified, the second section is capable of being separated from the first section at the boundary,
wherein upon the second section being separated from the first section, the second section is affixed to a second object, the second object being different from the first object, and
wherein the ID tag is disposed on the back surface of at least one of the first section and the second section.

2. The split-able label according to claim 1, wherein
said ID tag is a non-contact-type ID tag, having said transmitter-receiver configured by an antenna, and being capable of transmitting said identification information to and from the external device through non-contact communication.

3. The split-able label according to claim 1, wherein
said ID tag is a contact-type ID tag having said transmitter-receiver configured as a contact terminal exposed on the surface of said label base, and being capable of transmitting said identification information to and from the external device through contact communication.

4. The split-able label according to claim 1, wherein
said ID tag includes a support sheet formed integrally with said IC chip and said transmitter-receiver so as to support said IC chip and said transmitter-receiver.

5. The split-able label according to claim 4, wherein
said support sheet is configured as being transparent, or configured so that the surface opposite to the surface faced to the back surface of said label base is colored the same as the back surface of said label base.

6. The split-able label according to claim 1, wherein
said transmitter-receiver is configured so that the surface opposite to the surface faced to the back surface of said label base is colored the same as the back surface of said label base.

7. The split-able label according to claim 1, wherein
said label base has an adhesive layer covering the entire portion of said back surface, said ID tag, and an adhesive cover layer covering at least said ID tag formed in this order on said back surface thereof.

8. The split-able label according to claim 1, wherein
said label base has said ID tag formed directly on the back surface thereof, and said adhesive layer covering the entire portion of said back surface as well as said ID tag formed in this order, on said back surface thereof.

9. A split-able label comprising:
a label base having a back surface and being formed of a plurality of sections including a first section adjacent to a second section at a boundary therebetween, the back surface of the first section and the back surface of the second section not opposing each other;

an adhesive layer formed on a back surface of the label base;

a non-contact ID tag that includes an IC chip storing identification information of a first object to be identified and to which the split-able label is capable of being affixed and an antenna connected to said IC chip so as to transmit the identification information to and from an external device, wherein, in a state where the split-able label is affixed to the object to be identified, the second section is capable of being separated from the first section at the boundary, wherein upon the second section being separated from the first section, the second section is affixed to a second object, the second object being different from the first object, and wherein the non-contact ID tag is disposed on the back surface of said label base, and said antenna is formed over the boundary between said first section and said second section, and is cut upon splitting-off of said second section.

10. The split-able label according to claim 9, wherein said ID tag includes a support sheet formed integrally with said IC chip and said antenna, so as to support said IC chip and said antenna.

11. The split-able label according to claim 10, wherein said support sheet has a cutting line formed on the boundary between the first section and the second section.

12. The split-able label according to claim 11, wherein said antenna is formed over an uncut section of the cutting line on said support sheet.

13. The split-able label according to claim 10, wherein said support sheet has an incision made on at least one end of the boundary between said first section and said second section.

14. The split-able label according to claim 13, wherein said support sheet is configured as being transparent, or configured so that the surface opposite to the surface faced to the back surface of said label base is colored the same as the back surface of said label base.

15. The split-able label according to claim 9, wherein said antenna is configured so that the surface opposite to the surface faced to the back surface of said label base is colored the same as the back surface of said label base.

16. The split-able label according to claim 9, wherein said ID tag has a contact terminal connected to said IC chip, capable of transmitting said identification information to and from the external device through contact communication, and exposed to the surface of said label base.

17. The split-able label according to claim 9, wherein said label base has an adhesive layer covering the entire portion of said back surface, said ID tag, and an adhesive cover layer covering at least said ID tag formed in this order on said back surface thereof.

18. The split-able label according to claim 9, wherein said label base has said ID tag formed directly on the back surface thereof, and said adhesive layer covering the entire portion of said back surface as well as said ID tag formed in this order, on said back surface thereof.

* * * * *